March 19, 1946. J. P. PUTNAM 2,396,929
TIME INDICATOR
Filed Sept. 18, 1943 2 Sheets-Sheet 2

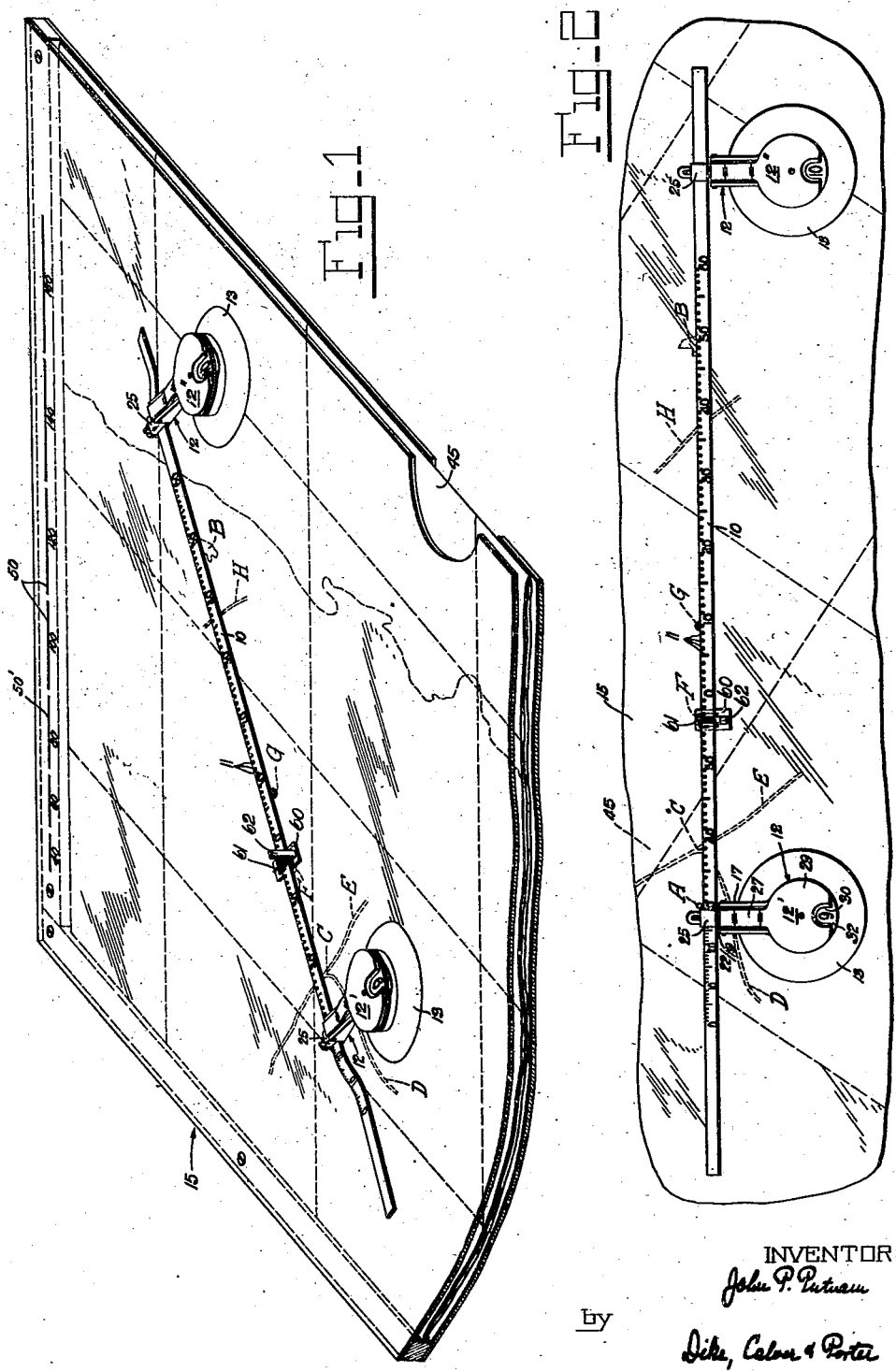

INVENTOR:
John P. Putnam
By
Dike, Calver & Porter
ATTORNEYS

Patented Mar. 19, 1946

2,396,929

UNITED STATES PATENT OFFICE 2,396,929

TIME INDICATOR

John P. Putnam, Boston, Mass., assignor to The Reece Button Hole Machine Company, Boston, Mass., a corporation of Maine Application September 18, 1943, Serial No. 502,961

10 Claims. (Cl. 33—137)

This invention relates to time indicators, and more particularly, though not exclusively, to a flight time indicator for use in aviation.

It is the primary aim and object of the present invention to provide an indicator which can be set to foretell the clock time at which an airplane passes any landmark or landmarks on its course, and the clock time at which it will reach its point of destination.

It is a more particular object of the present invention to provide for the use of the indicator in conjunction with a map, such that the indicator denotes opposite any point on the plane's course on the map, including the destination point, the clock time at which the plane will actually reach such point, and, conversely, indicates on the map the position of the plane on its course at any clock time.

It is another particular object of the present invention to provide an indicator which is set accurately by a simple adjustment in accordance with the actual clock time observed when the plane passes a selected landmark or check point on its course, preferably near the take-off point.

The foregoing and other objects of the present invention, together with means whereby the latter may be carried into effect, will best be understood from the following description of an illustrative embodiment shown in the accompanying drawings; in which, Fig. 1 illustrates perspectively the use of the present indicator in conjunction with a map.

Fig. 2 is a plan view of the indicator in use.

Figures 3, 5:
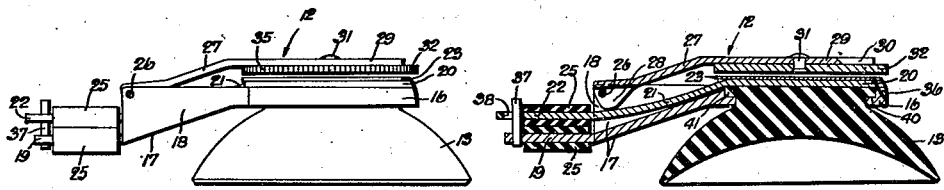
Fig. 3 is a side elevation of a clamp element of the indicator.
Fig. 5 is a section taken on the line 5—5 of Fig. 4.
Figures 4, 6:
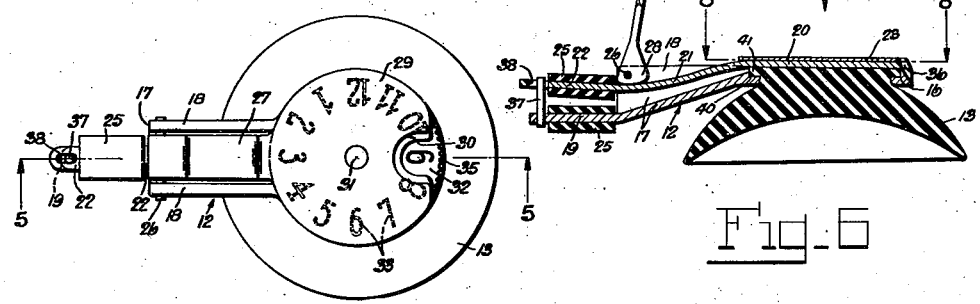
Fig. 4 is a plan view of the same clamp element.
Fig. 6 is a section similar to Fig. 5, showing the clamp element open.
Figure 7:
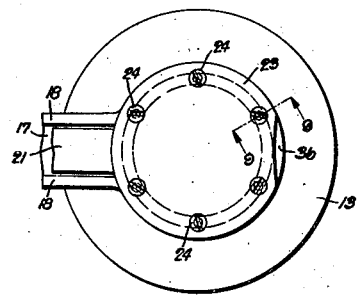
Fig. 7 is a fragmentary plan view of the clamp element as viewed in the direction of the arrow 7 in Fig. 6.
Figure 8:
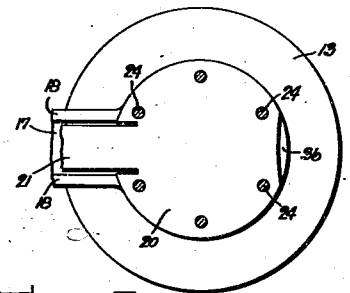
Fig. 8 is a fragmentary section taken along the line 8—8 of Fig. 6.

Referring to the drawings, and particularly to Figs. 1 and 2, the present time indicator comprises an elastic band 10, having marked thereon, as by indelible printing, for instance, uniformly spaced minute graduations 11, which in the present instance total two hours. The minute graduations 11, being marked on the elastic band 10 as explained, expand and contract with said band. The present time indicator further comprises two releasable clamps 12 between which any portion of the band 10 may be suspended in stretched or unstretched condition. Each of the clamps 12 carries a suction cup 13 for releasable attachment to a surface, such as the transparent top face of a map case 15, for instance.

Figure 9:
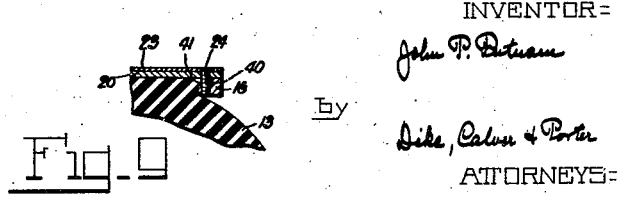
Fig. 9 is a fragmentary section taken on the line 9—9 of Fig. 7.

The clamps 12 being preferably identical, only one of these clamps will be described in detail with special reference to Figs. 3 to 9, inclusive. The same comprises a ring-shaped body 16, having a radially extending tongue 17 of U-shaped cross section. A reduced width of the yoke of the tongue 17 is extended beyond the legs 18 of the latter to form a fixed jaw 19. Superposed upon the ring-shaped body 16 is a disc 20 (Fig. 8), which is preferably of spring metal and has a radially extending leaf 21, the free end of which forms a movable jaw 22 which is adapted to cooperate with the fixed jaw 19. The leaf 21 extends in the U-shaped tongue 17 in the manner shown in Figs. 6 and 8. Superposed upon the disc 20 is a retainer disc 23. The discs 20 and 23 are secured to the ring-shaped body 16 by a plurality of screws 24, the heads of which are preferably sunk in the disc 23 (Fig. 9). The cooperating jaws 19 and 22 preferably receive rubber sleeves 25 with which to grip the band 10 (Fig. 1). The springy leaf 21 is normally urged into the position shown in Fig. 6 in which the jaw 22 is open. Pivotally mounted at 26 on the legs 18 of the U-shaped tongue 17 is a lever 27, one end of which is provided with spaced, depending ears 28 that serve as cams for opening and closing the movable jaw 22. The other end of the lever 27 is in the form of a disc-shaped shield 29 which is provided with an opening or notch 30. Mounted at 31 for rotation coaxially of the shield 29 is a clock dial 32 which bears hour indicia 33, any one hour indicium of which may be exposed in the notch 30 of the shield 29 on turning said clock dial. To facilitate the turning of the clock dial 32, the periphery of the same is preferably knurled as at 35. To provide for ready access to the clock dial 32 for purpose of opening the clamp (by rocking the lever 27 through intermediation of said clock dial from the position shown in Fig. 5 into that shown in Fig. 6), the ring-shaped body 16 and the superposed discs 20 and 23 are notched at 36. The fixed jaw 19 preferably carries a stud 37 which projects into an elongated slot 38 in the movable jaw 22 to prevent lateral relative displacement of said jaws. The ring-shaped body 16 of the clamp is preferably annularly recessed at 40 to receive the stem 41 of the suction cup 13.

The indicator described above may be used as follows: Suppose a pilot intends to take off at 9:30 a. m., for instance, from a point which is marked "A" on a map 45 (Fig. 2), and fly to a city or other destination which is marked "B" on the same map. The pilot preferably first inserts the map 45, suitably folded, in the transparent case 15 (Fig. 1) to afford a smooth and comparatively rigid surface (top face of map case) to which the suction cups 13 of the clamps 12 will stick when applied thereto. Next, the pilot may open the left clamp 12' and shift the band 10 between the open jaws 19, 22 thereof so as to bring the nearest "30" minute mark on said band (corresponding to the fraction of a whole hour included in the take-off time) adjacent the right side of the rubber covered jaws 19, 22 (Fig. 2), whereupon he closes the clamp 12'. The right clamp 12" preferably grips the band 10 anywhere beyond the right end of the minute graduations 11 thereon. The pilot may next turn the clock dials 32 of both clamps 12 such that the hour indicium "9" is exposed at the left clamp 12' (corresponding to the whole hour at which he intends to take-off), and the hour indicium "10" is exposed at the right clamp 12" (corresponding to the whole hour at which he expects to arrive at B). The pilot may then secure the left clamp 12', by means of its suction cup 13, to the top face of the map case 15 such that the take-off point A on the map 45 is adjacent the set 30 minute mark on the band at the clamp 12' (Fig. 2), and he then manipulates the other clamp 12" so as to bring the band 10 to intersection with the destination point B on the map. The pilot may then attach the clamp 12", by means of its suction cup 13, to the top face of the map case 15 without previously stretching the band 10, or he may, prior to the attachment of said clamp 12" to the map case, initially set the band 10 in accordance with the expected ground speed at which he intends to fly. If the pilot decides on an initial setting of the band 10 in accordance with the expected ground speed of the plane, he will move the clamp 12" away from the other, attached clamp 12' until the length of any 10 minute division on said band is observed to approximate the length of that one of a plurality of distance scales 50 on the map case 15 whose distance marking is equal to, or comes closest to, the intended or expected ground speed in miles per hour. In order that the pilot may thus initially set the band 10 by merely comparing the stretch of a relatively short 10 minute division thereon with the length of the proper distance scale 50, the scales 50 are drawn to ⅙ of the scale of the map 45, as will be readily understood. Thus if the pilot expects to fly at a ground speed of 80 miles per hour, for instance, he may initially set the band 10 by stretching the same, as explained, until the length of any 10 minute division thereon approximates the length of the 80 mile scale 50', and thereupon attach the clamp 12" to the map case with the stretched band 10 intersecting the destination point B on the map.

The setting of the indicator, as described so far, is preferably undertaken on the ground, and the pilot will then take the map case and attached indicator along in the plane. When the plane passes a landmark or check point recognized by the pilot, such as the junction of two highways near the take off point A, the pilot will check his watch time against the time indicated by the left clamp 12' and by the band 10 adjacent the intersection C of the same highways D and E on the map 45. If the pilot's watch time at the referred check point coincides with the time indicated by the indicator adjacent the same check point on the map, the band 10 has been previously accurately set (stretched) and no adjustment in the stretch of the same is required. In most cases, however, the pilot's watch time at the selected check point will, even when the band 10 has been initially set in accordance with the expected ground speed of the plane, differ from the time indicated by the indicator adjacent the same check point on the map. Thus, if the pilot's watch time at the check point is earlier than the time indicated by the indicator adjacent the same check point on the map, the pilot may open the clamp 12", further stretch the band 10, and then close said clamp 12" when the indicator time adjacent the check point on the map coincides with the watch time. Conversely, if the watch time at the check point is later than the time indicated by the indicator adjacent the same check point on the map, the pilot will permit the band 10 to contract until the indicator time at the check point on the map coincides with the watch time.

As mentioned, the pilot may dispense with the explained initial setting of the band 10 of the indicator in accordance with the expected ground speed of the plane, in which case he will, when coming to a recognized landmark or check point, set the band 10 for the first and perhaps only time in accordance with the watch time observed at said check point. Of course, the pilot may, and will in many instances, recheck the indicator time against his watch time at other landmarks or check points and, if necessary, undertake corrections in the stretch of the band 10.

In the present instance (Figs. 1 and 2), let it be assumed that the plane has just passed the check point C and the pilot has just set the band 10 in accordance with the watch time (9:38 a. m.) observed by him when the plane passed said check point. The pilot may then observe from the indicator that he will, barring changes in the ground speed of his plane, reach the outskirts of the destination point (city B) at 10:47 a. m., the hour "10" being read off the clock dial 32 of the clamp 12" and the minutes being read off the graduations on the band 10 adjacent the destination point B on the map 45 (Fig. 2). The pilot may then also observe from the indicator that he will on his further course cross over such readily recognizable landmarks as a lake F, a town G and a river H, for instance, at 9:56 a. m., 10:09 a. m. and 10:37 a. m., respectively.

To facilitate the pilot's task of checking the indicator time against his watch time and, if necessary, correct the indicator time in accordance with the watch time, when passing any of the check points (the lake F, for instance), the band 10 preferably carries a slidable runner 60 having a reference line 61 which the pilot aligns with the lake F on the map after passing the check point C. Then, when the plane passes the lake F, the pilot will compare the indicator time at the reference line 61 of the runner 60 with his watch time. If the watch time differs from the indicator time, he will shift the runner 60 on the band 10 until the reference line 61 aligns with that indicator time which corresponds with the watch time, and stretch the band 10, or permit it to contract, as the case may be, until the reference line 61 on the reset runner 60 aligns with the lake F on the map. It is now evident that the task of correcting the indicator time in accordance with the watch time is greatly facilitated by the described use of the runner 60, in that the pilot aligns with the lake F, for instance, on the map, a character (the reference line 61 of the runner) which has a markedly different appearance than the minute graduations on the band 10. The runner 60 is made of any suitable transparent (preferably plastic sheet) material of very small thickness and weight, and is slidably carried by the band 10 in the manner best indicated in Fig. 2. To manipulate the runner 60, the same is preferably provided with a handle 62.

While the band 10 is shown as bearing graduations of two consecutive 60 minutes divisions, the same may obviously be provided with a greater number of these divisions so that the indicator may be used for flights of longer duration.

While it is preferable to attach the indicator to a relatively stiff, transparent map case such as illustrated in Fig. 1, the indicator may obviously be directly attached (by means of its suction cups 13) to a map which is stiffened in any suitable manner. Hence, the map case disclosed in Fig. 1 may to all intents and purposes be considered a part of the map 45, justifying the reference in the appended claims to the attachment of the indicator to the map.

I claim:

1. A travel time indicator usable with a map, comprising a stretchable scale having uniformly spaced graduations, devices for holding spaced portions, respectively, of said scale, at least one of said devices being a releasable clamp, and means on said devices, respectively, for separate releasable attachment to the map remote from the region thereof spanned by said scale.

2. A travel time indicator usable with a map, comprising a stretchable scale having uniformly spaced minute graduations, two releasable clamps for holding any longitudinal portion of said scale, and a suction cup on each clamp for releasable attachment of the latter to the map.

3. A travel time indicator according to claim 2, in which said minute graduations cover at least two hours, and each clamp includes a shield with an opening and a clock dial behind said shield bearing hour indicia and being rotatable to expose any one hour indicium in said opening.

4. A travel time indicator usable with a map, comprising a stretchable scale having uniformly spaced minute graduations covering at least two hours, two releasable clamps for holding any longitudinal portion of said scale, each clamp having a fixed jaw and a movable jaw, a cam lever pivoted to said fixed jaw for forcing said movable jaw toward the other jaw to close the clamp, a clock dial rotatably mounted on said lever and bearing hour indicia, said lever providing a shield over said clock dial with an opening in which any one hour indicium may be exposed to view on turning said dial, and a suction cup on the fixed jaw of each clamp for releasable attachment of the latter to the map.

5. A travel time indicator according to claim 4, in which the movable jaw of each clamp is in form of a leaf spring mounted with one end on its cooperating fixed jaw and normally urged with its other, clamping end away from the latter jaw.

6. A travel time indicator usable with a map, comprising a stretchable scale having uniform graduations cyclic by sixties, first means releasably attachable to the map and adapted to position any longitudinal portion of said scale in unstretched or any stretched condition alongside the intended travel course on the map, and hour indicating means carried by said first means and being settable to indicate any hour of the day.

7. A travel time indicator usable with a map, comprising a stretchable scale having uniform graduations cyclic by sixties, separate devices releasably attachable to the map and connected with spaced portions, respectively, of said scale to position the latter in unstretched or any stretched condition alongside the intended travel course on the map, and hour indicating means carried by one of said devices and being settable to indicate any hour of the day.

8. A travel time indicator according to claim 7, in which each device includes a suction cup for releasable attachment to the map.

9. A travel time indicator according to claim 7, in which at least one of said devices includes a releasable clamp by which it is connected with said scale.

10. A travel time indicator according to claim 7, in which said hour indicating means comprises a shield with an opening and a clock dial behind said shield bearing hour indicia and being rotatable to expose any one hour indicium in said opening.

JOHN P. PUTNAM.